(12) United States Patent
Huang et al.

(10) Patent No.: US 11,590,615 B2
(45) Date of Patent: Feb. 28, 2023

(54) TOOL AND METHOD FOR REPLACING ESCALATOR DRIVE SPINDLE

(71) Applicant: INVENTIO AG, Hergiswil (CH)

(72) Inventors: Tao Huang, Shanghai (CN); Yongsheng Wang, Shanghai (CN); Xiang Gao, Shanghai (CN)

(73) Assignee: INVENTIO AG, Hergiswil (CH)

( * ) Notice: Subject to any disclaimer, the term of this patent is extended or adjusted under 35 U.S.C. 154(b) by 48 days.

(21) Appl. No.: 17/310,048

(22) PCT Filed: Nov. 7, 2019

(86) PCT No.: PCT/CN2019/116258
§ 371 (c)(1),
(2) Date: Jul. 13, 2021

(87) PCT Pub. No.: WO2020/147382
PCT Pub. Date: Jul. 23, 2020

(65) Prior Publication Data
US 2022/0048144 A1    Feb. 17, 2022

(30) Foreign Application Priority Data

Jan. 14, 2019 (CN) .......................... 201910030571.2
Jan. 14, 2019 (CN) .......................... 201910030589.2

(51) Int. Cl.
*B23P 6/00* (2006.01)
*B25B 27/00* (2006.01)
*B66B 23/02* (2006.01)

(52) U.S. Cl.
CPC ................ *B23P 6/00* (2013.01); *B25B 27/00* (2013.01); *B66B 23/02* (2013.01)

(58) Field of Classification Search
CPC . B23P 6/00; B25B 27/00; B25B 27/14; B66B 23/02
See application file for complete search history.

(56) References Cited

U.S. PATENT DOCUMENTS 8,112,855 B1    2/2012  Balliew
2017/0209994 A1  7/2017  Hargrove et al.

FOREIGN PATENT DOCUMENTS

CN     202106337 U  *  1/2012
CN     202106337 U     1/2012
(Continued)

OTHER PUBLICATIONS

International Search Report for International Application No. PCT/CN2019/116258 dated Jan. 23, 2020.

*Primary Examiner* — Jun S Yoo
(74) *Attorney, Agent, or Firm* — Knobbe Martens Olson & Bear LLP (57) ABSTRACT

A tool for replacing an escalator drive shaft comprises a first tool and a second tool. One side of the first tool is adapted to be assembled on an original shaft adapter, and the other side of the first tool is adapted to be assembled on a new shaft adapter. The second tool is adapted to be assembled on the first tool. A central axis of the first tool coincides with a central axis of the original shaft adapter, a central axis of the second tool coincides with the central axis of the first tool, and the central axis of the first tool coincides with a central axis of the new shaft adapter. A positioning reference of the original drive shaft is accurately transferred to the new drive shaft by the first and second tools, so that the new drive shaft may be accurately assembled to the position of the original drive shaft with respect to the truss after replacement.

25 Claims, 11 Drawing Sheets

(56) References Cited

FOREIGN PATENT DOCUMENTS

| CN | 202292633 U | | 7/2012 |
|---|---|---|---|
| CN | 203426952 U | | 2/2014 |
| CN | 109732507 A | | 5/2019 |
| CN | 109732525 A | | 5/2019 |
| CN | 209427943 U | | 9/2019 |
| JP | H05105384 A | * | 4/1993 |
| JP | H11138460 A | | 5/1999 |

* cited by examiner

TOOL AND METHOD FOR REPLACING ESCALATOR DRIVE SPINDLE

BACKGROUND

Field

The disclosure relates to a tool and a method for replacing the drive shaft of escalator or moving walk.

Description of the Related Art

According to EN 115-1; 2017 and GB 16899-2011 an auxiliary brake is not mandatorily required for the escalator or moving walk with a rise not higher than 6 meters. However, in order to protect passengers and to improve the safety level of the escalator or moving walk in several cases like a drive chain breakage, a displacement of the driving machine or a failure of the operational brake, it may be a need to modernize an escalator or moving walk already in use which has no auxiliary brake.

In a current common design, the auxiliary brake and the drive shaft are of a coaxial design. Therefore, adding the auxiliary brake function to a drive shaft mounted in the truss is not possible so that the drive shaft of the escalator or the moving walk needs to be removed.

In order to ensure a certain ride comfort of the escalator or the moving walk and to prevent the premature failure of the step chain, the step chain sprocket, the drive chain and the drive chain sprocket due to wear or other environmental impacts, it is necessary to strictly determine the relative position between the drive shaft, the truss and the guide rail through special tooling in the assembly workshop to ensure the assembly accuracy.

Figure 1:
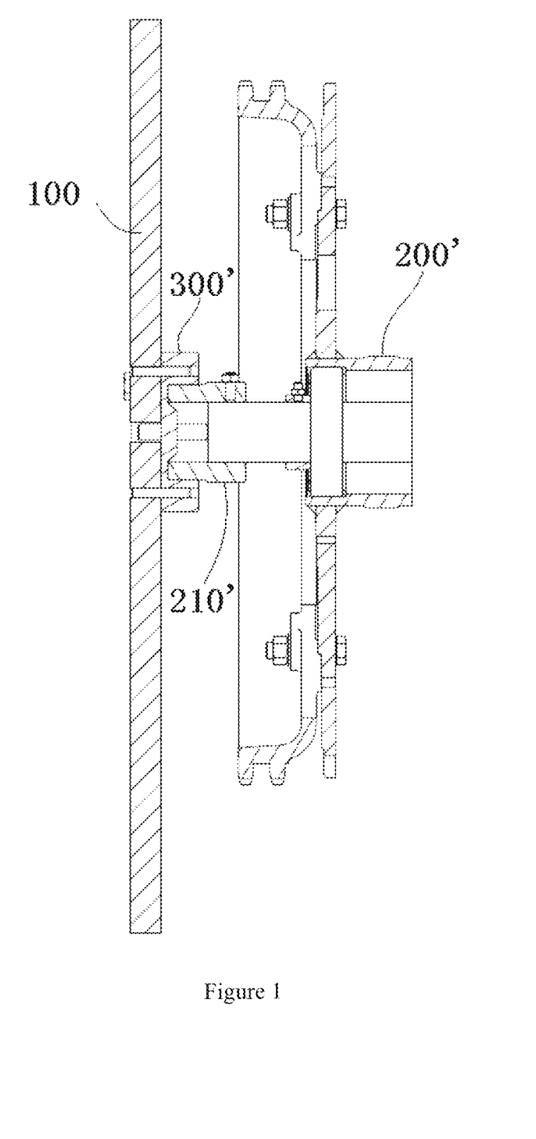
FIG. 1 is an illustrative view of an original drive shaft, an original shaft collar and an original shaft adapter installed on a truss before replacement.

FIG. 1 shows an escalator or a moving walk in use without auxiliary brake function. As shown in FIG. 1, the relative position between the drive shaft (referred as an original drive shaft 200' herein) and the truss 100 is guaranteed by a special part (referred as an original shaft adapter 300' herein). If the new shaft adapter 300 (see FIG. 9) of the new drive shaft equipped with the auxiliary brake function (referred as the new drive shaft 200) is different from the original shaft adapter 300', the positioning reference of the new drive shaft 200 will be lost due to the replacement of the new shaft adapter 300 and the original shaft adapter 300'. This will cause the position of the new drive shaft 200 with respect to the truss 100 after replacement to be different from that of the original drive shaft 200' with respect to the truss 100 before replacement.

SUMMARY

The present disclosure has been made to overcome or alleviate at least one aspect of the above-mentioned problems or disadvantages.

According to an aspect of the present disclosure, there is provided a tool for replacing the drive shaft of escalator or moving walk, comprising: a first tool, one side of which is adapted to be assembled on an original shaft adapter, and the other side of which is adapted to be assembled on a new shaft adapter and a second tool adapted to be assembled on the first tool. When the first tool is assembled on the original shaft adapter, a central axis of the first tool coincides with a central axis of the original shaft adapter. When the second tool is assembled on the first tool, a central axis of the second tool coincides with the central axis of the first tool. When the first tool is assembled on the new shaft adapter, the central axis of the first tool coincides with a central axis of the new shaft adapter.

According to an exemplary embodiment of the present disclosure, the first tool and the original shaft adapter have first positioning features which fit with each other, so that the central axis of the first tool assembled on the original shaft adapter coincides with the central axis of the original shaft adapter.

According to another exemplary embodiment of the present disclosure, a circular concave part is formed on the original shaft adapter and a columnar convex part which is matched with the circular concave part is formed on the first tool. The first positioning features include an outer peripheral surface of the cylindrical convex part and an inner peripheral surface of the circular concave part, the outer peripheral surface of the cylindrical convex part is precisely matched with the inner peripheral surface of the circular concave part.

According to another exemplary embodiment of the present disclosure, a first accommodating cavity is formed on one side of the first tool and the original shaft adapter is adapted to be accommodated in the first accommodating cavity.

According to another exemplary embodiment of the present disclosure, the first tool and the second tool have second positioning features which fit with each other, so that the central axis of the second tool assembled on the first tool coincides with the central axis of the original shaft adapter.

According to another exemplary embodiment of the present disclosure, the second tool is circular and adapted to be sleeved on the first tool.

According to another exemplary embodiment of the present disclosure, the second positioning features include an outer peripheral surface of the first tool and an inner peripheral surface of the second tool, and the outer peripheral surface of the first tool is precisely matched with the inner peripheral surface of the second tool.

According to another exemplary embodiment of the present disclosure, a connecting hole corresponding to a threaded hole in the original shaft adapter is formed in the first tool. The first tool is adapted to be connected to the original shaft adapter by a first threaded fastener passing through the connecting hole.

According to another exemplary embodiment of the present disclosure, a mounting slot is formed in the second tool, and the second tool is adapted to be connected to a truss of the escalator by a second threaded fastener passing through the mounting slot.

According to another exemplary embodiment of the present disclosure, the first tool and the new shaft adapter have third positioning features which fit with each other, so that the central axis of the first tool assembled on the new shaft adapter coincides with the central axis of the new shaft adapter.

According to another exemplary embodiment of the present disclosure, a second accommodating cavity is formed on the other side of the first tool, and the new shaft adapter is adapted to be accommodated in the second accommodating cavity of the first tool.

According to another exemplary embodiment of the present disclosure, the third positioning features include an inner peripheral surface of the second accommodating cavity and an outer peripheral surface of the new shaft adapter and the inner peripheral surface of the second accommodating cavity of the first tool is precisely matched with the outer peripheral surface of the new shaft adapter.

According to another aspect of the present disclosure, there is provided a method for replacing an escalator drive shaft, comprising steps of:

S101: removing an original drive shaft and an original shaft collar from a truss of an escalator, and retaining an original shaft adapter matching with the original shaft collar on the truss;

S102: providing a first tool, and assembling one side of the first tool on the original shaft adapter, wherein the first tool and the original shaft adapter have first positioning features which fit with each other, so that a central axis of the first tool assembled on the original shaft adapter coincides with a central axis of the original shaft adapter;

S103: providing a second tool, assembling the second tool on the first tool, wherein the first tool and the second tool have second positioning features which fit with each other, so that a central axis of the second tool assembled on the first tool coincides with the central axis of the first tool;

S104: fixing the second tool on the truss;

S105: removing the first tool and the original shaft adapter from the truss;

S106: assembling the other side of the first tool on a new shaft adapter, wherein the first tool and the new shaft adapter have third positioning features which fit with each other, so that the central axis of the first tool assembled on the new shaft adapter coincides with the central axis of the new shaft adapter;

S107: assembling the first tool and the new shaft adapter into the second tool, wherein the first tool and the second tool matching with each other by the second positioning features, so that the central axis of the new shaft adapter coincides with the central axis of the second tool;

S108: fixing the new shaft adapter to the truss;

S109: removing the first tool and the second tool from the truss;

S110: assembling a new drive shaft and a new shaft collar onto the new shaft adapter.

According to an exemplary embodiment of the present disclosure, a circular concave part is formed on the original shaft adapter and a columnar convex part which is matched with the circular concave part is formed on the first tool. The first positioning features include an outer peripheral surface of the cylindrical convex part and an inner peripheral surface of the circular concave part, the outer peripheral surface of the cylindrical convex part is precisely matched with the inner peripheral surface of the circular concave part.

According to another exemplary embodiment of the present disclosure, in the step S102, after the first tool is assembled to the original shaft adapter, the first tool is fixed to the original shaft adapter by a first threaded fastener.

According to another exemplary embodiment of the present disclosure, a connecting hole corresponding to a threaded hole in the original shaft adapter is formed in the first tool. The first threaded fastener passes through the connecting hole in the first tool and is screwed into the threaded hole in the original shaft adapter, so as to fix the first tool on the original shaft adapter.

According to another exemplary embodiment of the present disclosure, a first accommodating cavity is formed on one side of the first tool, and the original shaft adapter is adapted to be accommodated in the first accommodating cavity.

According to another exemplary embodiment of the present disclosure, the second tool is circular and adapted to be sleeved on the first tool.

According to another exemplary embodiment of the present disclosure, the second positioning features include an outer peripheral surface of the first tool and an inner peripheral surface of the second tool, and the outer peripheral surface of the first tool is precisely matched with the inner peripheral surface of the second tool.

According to another exemplary embodiment of the present disclosure, in the step S104, the second tool is fixed to the truss by a second threaded fastener.

According to another exemplary embodiment of the present disclosure, a mounting slot is formed in the second tool, the second threaded fastener passes through the mounting slot and is threaded to the truss, so as to fix the second tool to the truss.

According to another exemplary embodiment of the present disclosure, a second accommodating cavity is formed on the other side of the first tool, and the new shaft adapter is adapted to be accommodated in the second accommodating cavity of the first tool.

According to another exemplary embodiment of the present disclosure, the third positioning features include an inner peripheral surface of the second accommodating cavity and an outer peripheral surface of the new shaft adapter, and the inner peripheral surface of the second accommodating cavity of the first tool is precisely matched with the outer peripheral surface of the new shaft adapter.

According to another exemplary embodiment of the present disclosure, in the step S108, the new shaft adapter is fixed to the truss by a third threaded fastener.

According to another exemplary embodiment of the present disclosure, a first pin hole is formed in the new shaft adapter and a second pin hole corresponding to the first pin hole is formed in the truss. In the step S109, after the first tool and the second tool are removed from the truss, a pin is inserted into the first pin hole and the second pin hole to improve the connection strength between the new shaft adapter and the truss.

In the above exemplary embodiments according to the present disclosure, a set of tools for replacing the escalator drive shaft is provided, through which the positioning reference of the original shaft can be accurately transferred to the new drive shaft, so that the new drive shaft can be accurately assembled to the position of the original drive shaft with respect to the truss after replacement. This can ensure that the position of the new drive shaft with respect to the truss after replacement is the same as that of the original drive shaft relative to the truss before replacement.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present disclosure, there is provided a tool for replacing an escalator drive shaft, comprising: a first tool, one side of which is adapted to be assembled on an original shaft adapter, and the other side of which is adapted to be assembled on a new shaft adapter; and a second tool adapted to be assembled on the first tool. When the first tool is assembled on the original shaft adapter, a central axis of the first tool coincides with a central axis of the original shaft adapter; when the second tool is assembled on the first tool, a central axis of the second tool coincides with the central axis of the first tool; when the first tool is assembled on the new shaft adapter, the central axis of the first tool coincides with a central axis of the new shaft adapter.

According to another general concept of the present disclosure, there is provided a method for replacing an escalator drive shaft, comprising steps of:

removing an original drive shaft and an original shaft collar from a truss of an escalator, and retaining an original shaft adapter matching with the original shaft collar on the truss;

providing a first tool, and assembling one side of the first tool on the original shaft adapter, wherein the first tool and the original shaft adapter have first positioning features which fit with each other, so that a central axis of the first tool assembled on the original shaft adapter coincides with a central axis of the original shaft adapter;

providing a second tool, assembling the second tool on the first tool, wherein the first tool and the second tool have second positioning features which fit with each other, so that a central axis of the second tool assembled on the first tool coincides with the central axis of the first tool;

fixing the second tool on the truss;

removing the first tool and the original shaft adapter from the truss;

assembling the other side of the first tool on a new shaft adapter, wherein the first tool and the new shaft adapter have third positioning features which fit with each other, so that the central axis of the first tool assembled on the new shaft adapter coincides with the central axis of the new shaft adapter, assembling the first tool and the new shaft adapter into the second tool, wherein the first tool and the second tool matching with each other by the second positioning features, so that the central axis of the new shaft adapter coincides with the central axis of the second tool; fixing the new shaft adapter to the truss; and removing the first tool and the second tool from the truss; assembling a new drive shaft and a new shaft collar onto the new shaft adapter.

Figure 2:
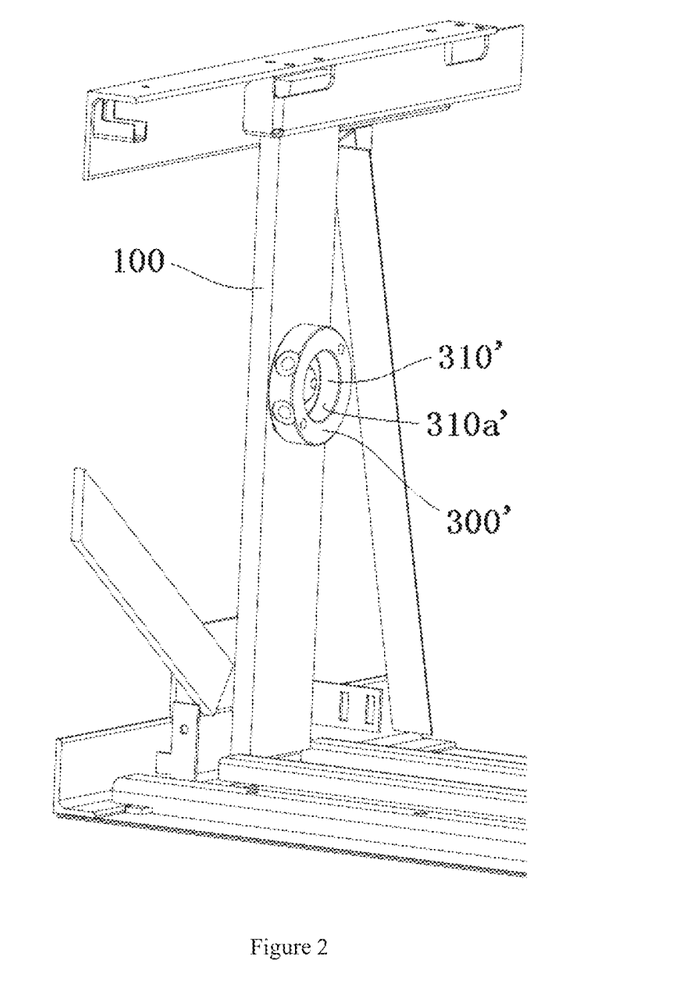
FIG. 2 is an illustrative view of removing the original drive shaft and the original shaft collar from the truss and retaining only the original shaft adapter.
Figure 3:
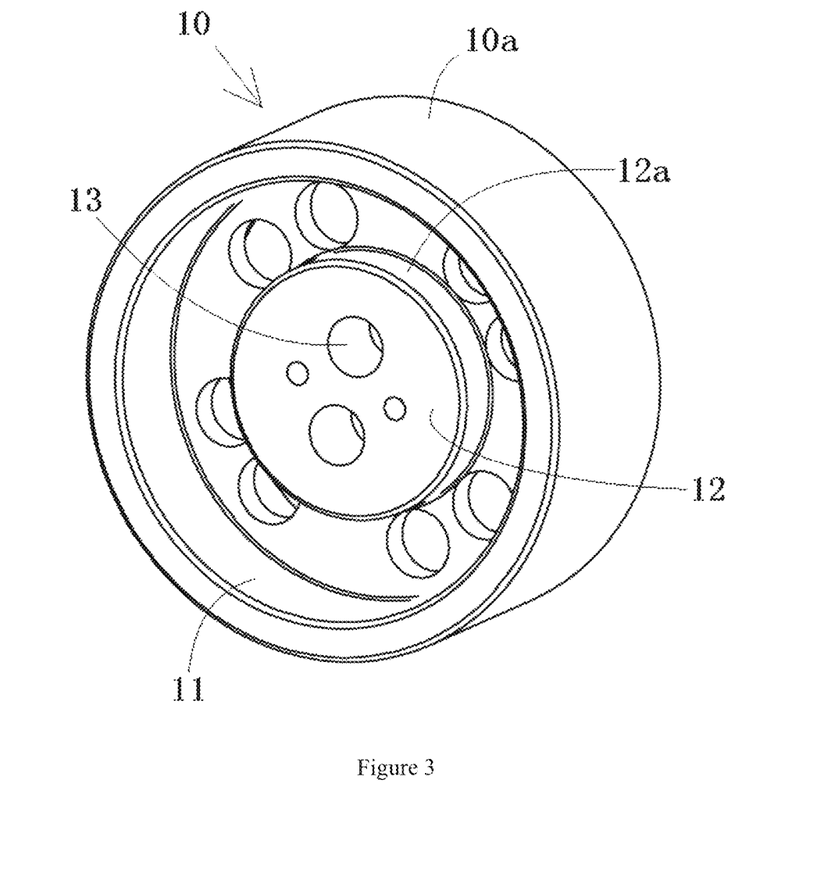
FIG. 3 is an illustrative perspective view of a first tool when viewed from one side according to an exemplary embodiment of the present disclosure.
Figure 4:
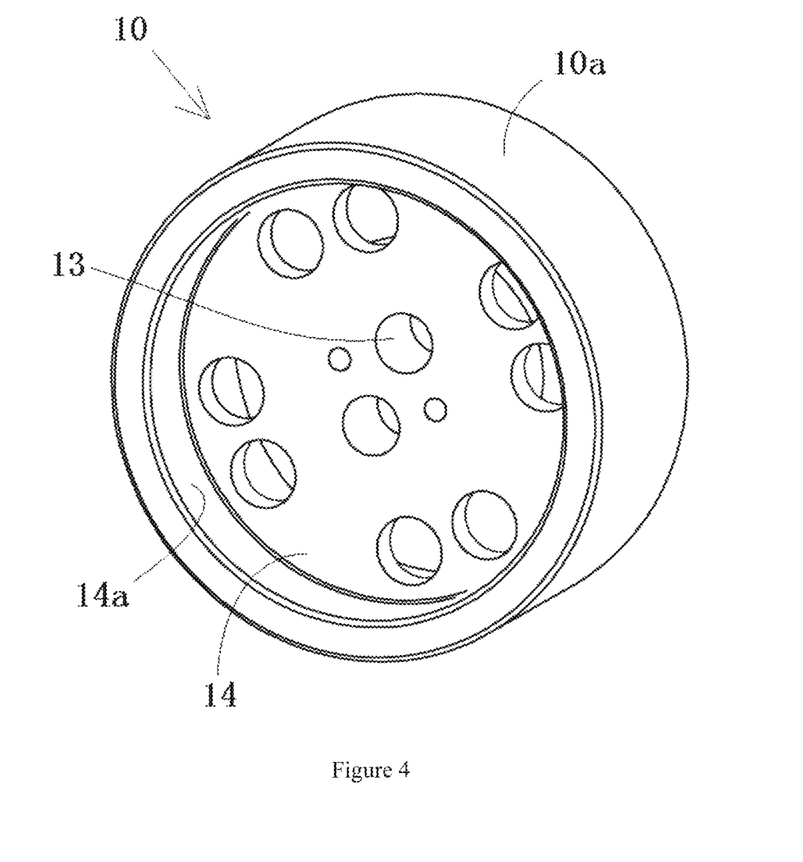
FIG. 4 is an illustrative perspective view of the first tool when viewed from the other side according to an exemplary embodiment of the present disclosure.
Figure 6:
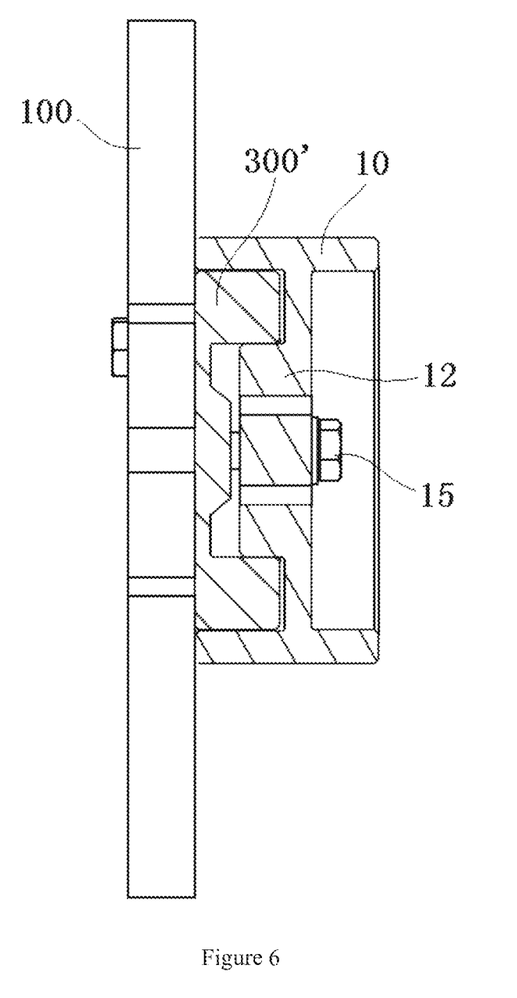
FIG. 6 is an illustrative view of assembling one side of the first tool of FIG. 3 on the original shaft adapter of FIG. 2.

FIG. 1 is an illustrative view of an original drive shaft 200', an original shaft collar 210' and an original shaft adapter 300' installed on a truss 100 before replacement. FIG. 2 is an illustrative view of removing the original drive shaft 200' and the original shaft collar 210' from the truss 100 and retaining only the original shaft adapter 300'. FIG. 3 is an illustrative perspective view of a first tool 10 when viewed from one side according to an exemplary embodiment of the present disclosure. FIG. 4 is an illustrative perspective view of the first tool 10 when viewed from the other side according to an exemplary embodiment of the present disclosure. FIG. 6 is an illustrative view of assembling one side of the first tool 10 of FIG. 3 on the original shaft adapter 300' of FIG. 2.

As shown in FIGS. 1-4 and 6, in an embodiment, one side of the first tool 10 is adapted to be assembled on the original shaft adapter 300'. When the first tool 10 is assembled on the original shaft adapter 300', a central axis of the first tool 10 coincides with a central axis of the original shaft adapter 300'.

Figure 5:
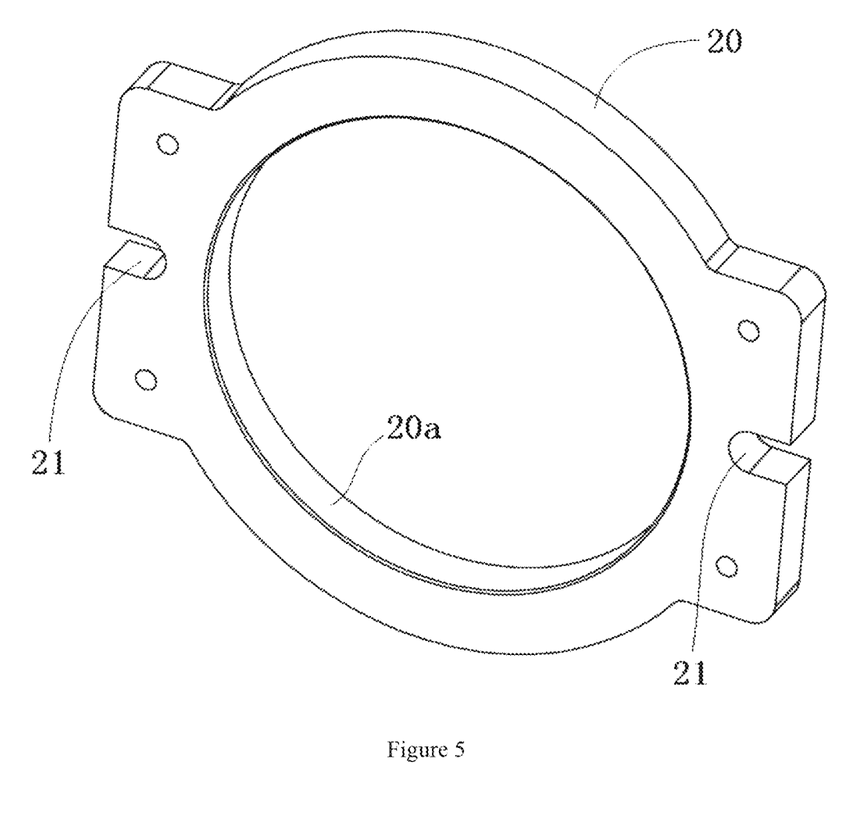
FIG. 5 is an illustrative perspective view of a second tool according to an exemplary embodiment of the present disclosure.
Figure 7:
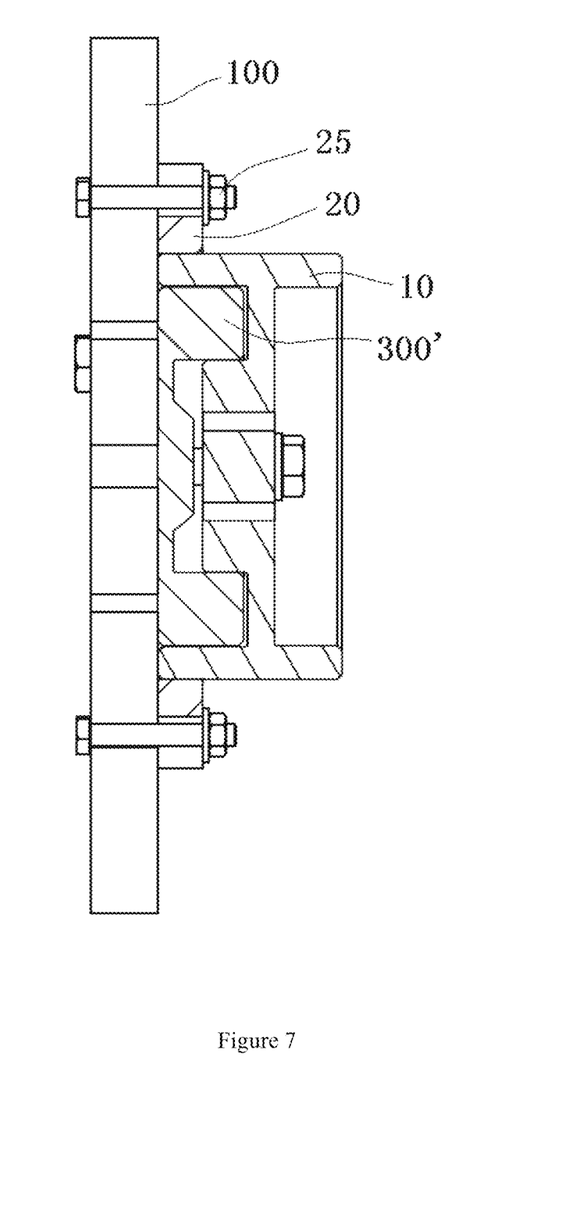
FIG. 7 is an illustrative view of assembling the second tool of FIG. 5 on the first tool of FIG. 6.

FIG. 5 is an illustrative perspective view of a second tool 20 according to an exemplary embodiment of the present disclosure. FIG. 7 is an illustrative view of assembling the second tool 20 of FIG. 5 on the first tool 10 of FIG. 6.

As shown in FIGS. 5-7, in an embodiment, the second tool 20 is adapted to be assembled on the first tool 10. When the second tool 20 is assembled on the first tool 10, a central axis of the second tool 20 coincides with the central axis of the first tool 10.

Figure 8:
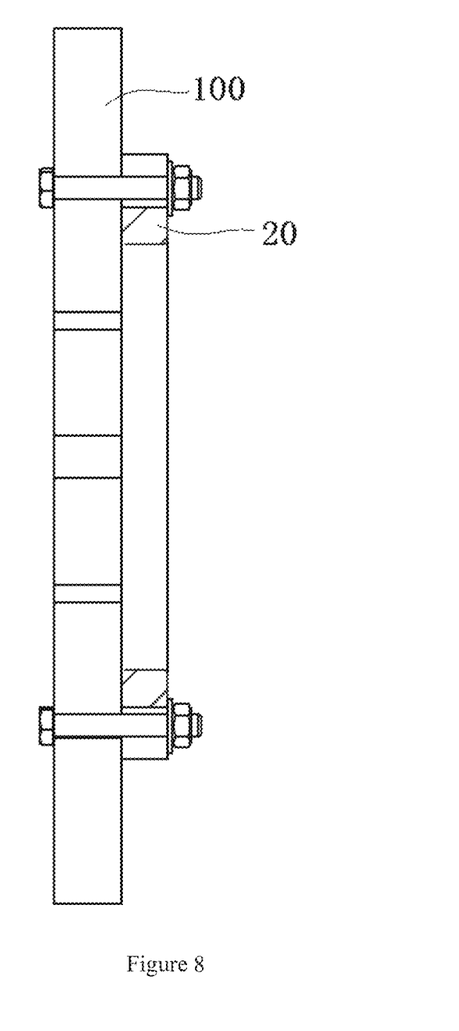
FIG. 8 is an illustrative view of removing the first tool and the original shaft adapter of FIG. 7 from the truss.
Figure 9:
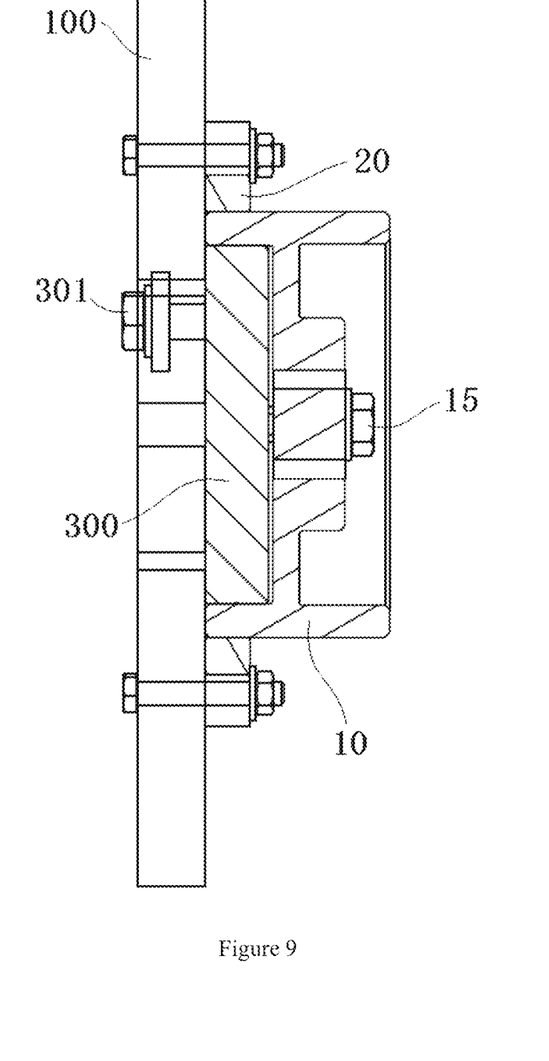
FIG. 9 is an illustrative view of assembling the first tool and a new shaft adapter on the second tool of FIG. 8.

FIG. 8 is an illustrative view of removing the first tool 10 and the original shaft adapter 300' of FIG. 7 from the truss 100. FIG. 9 is an illustrative view of assembling the first tool 10 and a new shaft adapter 300 on the second tool 20 of FIG. 8.

As shown in FIGS. 1-9, in an embodiment, the other side of the first tool 10 is adapted to be assembled on the new shaft adapter 300. When the first tool 10 is assembled on the new shaft adapter 300, the central axis of the first tool 10 coincides with a central axis of the new shaft adapter 300.

As shown in FIGS. 1-9, in an embodiment, the first tool 10 and the original shaft adapter 300' have first positioning features 310a', 12a which fit with each other, so that the central axis of the first tool 10 assembled on the original shaft adapter 300' coincides with the central axis of the original shaft adapter 300'.

As shown in FIGS. 1-9, in an embodiment, a circular concave part 310' is formed on the original shaft adapter 300', and a columnar convex part 12 which is matched with the circular concave part 310' is formed on the first tool 10. The first positioning features 310a', 12a include an outer peripheral surface 12a of the cylindrical convex part 12 and an inner peripheral surface 310a' of the circular concave part 310'. The outer peripheral surface 12a of the cylindrical convex part 12 is precisely matched with the inner peripheral surface 310a' of the circular concave part 310'.

As shown in FIGS. 1-9, in an embodiment, a first accommodating cavity 11 is formed on one side of the first tool 10, and the original shaft adapter 300' is adapted to be accommodated in the first accommodating cavity 11.

As shown in FIGS. 1-9, in an embodiment, the first tool 10 and the second tool 20 have second positioning features 10a, 20a which fit with each other, so that the central axis of the second tool 20 assembled on the first tool 10 coincides with the central axis of the original shaft adapter 300'.

As shown in FIGS. 1-9, in an embodiment, the second tool 20 is circular and adapted to be sleeved on the first tool 10.

As shown in FIGS. 1-9, in an embodiment, the second positioning features 10a, 20a include an outer peripheral surface 10a of the first tool 10 and an inner peripheral surface 20a of the second tool 20. The outer peripheral surface 10a of the first tool 10 is precisely matched with the inner peripheral surface 20a of the second tool 20.

As shown in FIGS. 1-9, in an embodiment, a connecting hole 13 corresponding to a threaded hole in the original shaft adapter 300' is formed in the first tool 10. The first tool 10 is adapted to be connected to the original shaft adapter 300' by a first threaded fastener 15 passing through the connecting hole 13.

As shown in FIGS. 1-9, in an embodiment, a mounting slot 21 is formed in the second tool 20, and the second tool 20 is adapted to be connected to the truss 100 of the escalator by a second threaded fastener 25 passing through the mounting slot 21.

As shown in FIGS. 1-9, in an embodiment, the first tool 10 and the new shaft adapter 300 have third positioning features 300a, 14a which fit with each other, so that the central axis of the first tool 10 assembled on the new shaft adapter 300 coincides with the central axis of the new shaft adapter 300.

As shown in FIGS. 1-9, in an embodiment, a second accommodating cavity 14 is formed on the other side of the first tool 10, and the new shaft adapter 300 is adapted to be accommodated in the second accommodating cavity 14 of the first tool 10.

As shown in FIGS. 1-9, in an embodiment, the third positioning features 300a, 14a include an inner peripheral surface 14a of the second accommodating cavity 14 and an outer peripheral surface 300a of the new shaft adapter 300. The inner peripheral surface 14a of the second accommodating cavity 14 of the first tool 10 is precisely matched with the outer peripheral surface 300a of the new shaft adapter 300.

Figure 10:
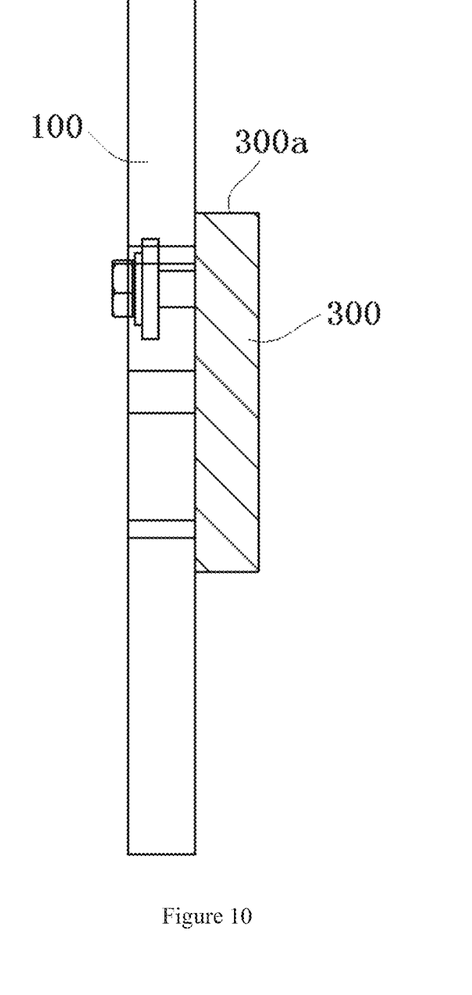
FIG. 10 is an illustrative view of removing the first tool and the second tool of FIG. 9 from the truss.
Figure 11:
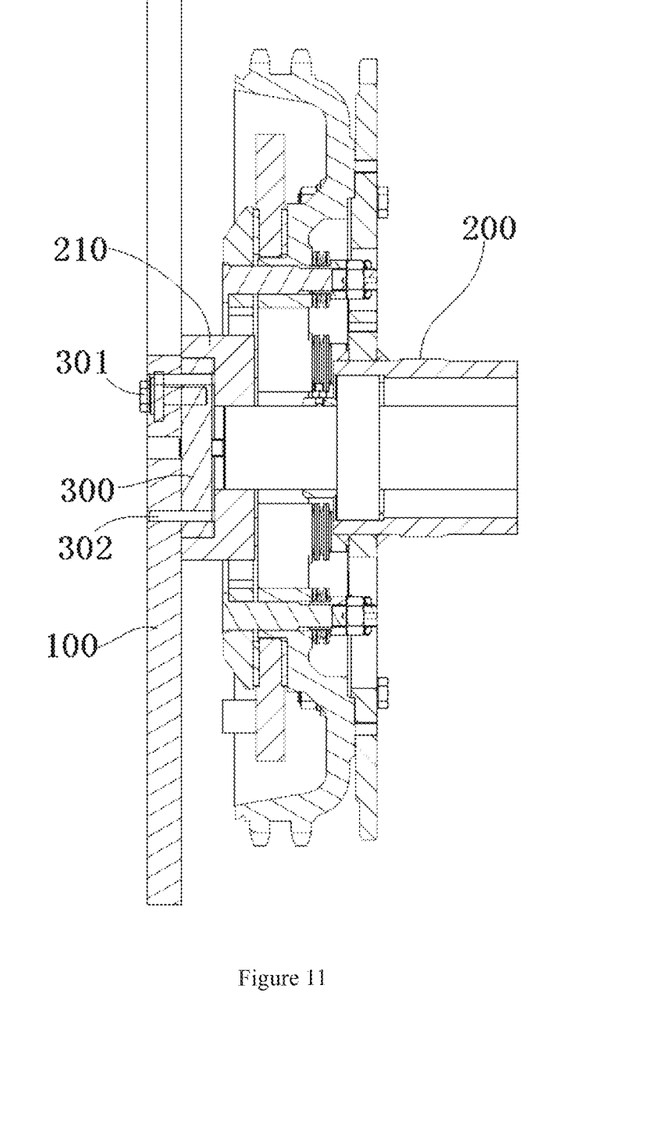
FIG. 11 is an illustrative view of assembling the new drive shaft and the new shaft collar onto the new shaft adapter of FIG. 10.

FIG. 10 is an illustrative view of removing the first tool 10 and the second tool 20 of FIG. 9 from the truss; and FIG. 11 is an illustrative view of assembling the new drive shaft 200 and the new shaft collar 210 onto the new shaft adapter 300 of FIG. 10.

Hereafter, it will describe the method for replacing an escalator drive shaft with reference to FIGS. 1-11. The method for replacing the escalator drive shaft mainly comprises steps of:

S101: as shown in FIGS. 1-2, removing an original drive shaft 200' and an original shaft collar 210' from a truss 100 of an escalator, and retaining an original shaft adapter 300' matching with the original shaft collar 210' on the truss 100;

S102: as shown in FIGS. 3-4 and 6, providing a first tool 10, and assembling one side of the first tool 10 on the original shaft adapter 300', wherein the first tool 10 and the original shaft adapter 300' have first positioning features 310a', 12a which fit with each other, so that a central axis of the first tool 10 assembled on the original shaft adapter 300' coincides with a central axis of the original shaft adapter 300';

S103: as shown in FIGS. 5 and 7, providing a second tool 20, assembling the second tool 20 on the first tool 10, wherein the first tool 10 and the second tool 20 have second positioning features 10a, 20a which fit with each other, so that a central axis of the second tool 20 assembled on the first tool 10 coincides with the central axis of the first tool 10;

S104: as shown in FIG. 7, fixing the second tool 20 on the truss 100;

S105: as shown in FIG. 8, removing the first tool 10 and the original shaft adapter 300' from the truss 100;

S106: as shown in FIG. 9, assembling the other side of the first tool 10 on a new shaft adapter 300, wherein the first tool 10 and the new shaft adapter 300 have third positioning features 300a, 14a which fit with each other, so that the central axis of the first tool 10 assembled on the new shaft adapter 300 coincides with the central axis of the new shaft adapter 300;

S107: as shown in FIG. 9, assembling the first tool 10 and the new shaft adapter 300 into the second tool 20, wherein the first tool 10 and the second tool 20 matching with each other by the second positioning features 10a, 20a, so that the central axis of the new shaft adapter 300 coincides with the central axis of the second tool 20;

S108: as shown in FIG. 9, fixing the new shaft adapter 300 to the truss 100;

S109: as shown in FIG. 10, removing the first tool 10 and the second tool 20 from the truss 100;

S110: as shown in FIG. 11, assembling a new drive shaft 200 and a new shaft collar 210 onto the new shaft adapter 300.

In an embodiment of the present disclosure, as shown in FIG. 6, in the step S102, after the first tool 10 is assembled to the original shaft adapter 300', the first tool 10 is fixed to the original shaft adapter 300' by a first threaded fastener 15.

In an embodiment of the present disclosure, as shown in FIG. 7, in the step S104, the second tool 20 is fixed to the truss 100 by a second threaded fastener 25.

In an embodiment of the present disclosure, as shown in FIG. 9, in the step S108, the new shaft adapter 300 is fixed to the truss 100 by a third threaded fastener 301.

In an embodiment of the present disclosure, as shown in FIG. 11, a first pin hole is formed in the new shaft adapter 300, and a second pin hole corresponding to the first pin hole is formed in the truss 100. In the step S109, after the first tool 10 and the second tool 20 are removed from the truss 100, a pin 302 is inserted into the first pin hole and the second pin hole to improve the connection strength between the new shaft adapter 300 and the truss 100.

It should be appreciated for those skilled in this art that the above embodiments are intended to be illustrative and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A tool for replacing an escalator drive shaft, the tool comprising:
   a first tool, a first side of the first tool adapted to be assembled on an original shaft adapter, and a second side of the first tool adapted to be assembled on a new shaft adapter; and
   a second tool adapted to be assembled on the first tool, wherein:
      when the first tool is assembled on the original shaft adapter, a central axis of the first tool coincides with a central axis of the original shaft adapter,
      when the second tool is assembled on the first tool, a central axis of the second tool coincides with the central axis of the first tool,
      when the first tool is assembled on the new shaft adapter, the central axis of the first tool coincides with a central axis of the new shaft adapter.

2. The tool for replacing an escalator drive shaft according to claim 1, wherein the first tool and the original shaft adapter have first positioning features which fit with each other, so that the central axis of the first tool assembled on the original shaft adapter coincides with the central axis of the original shaft adapter.

3. The tool for replacing an escalator drive shaft according to claim 2, wherein:
   a circular concave part is formed on the original shaft adapter, and a columnar convex part which is matched with the circular concave part is formed on the first tool;
   the first positioning features include an outer peripheral surface of the cylindrical convex part and an inner peripheral surface of the circular concave part, the outer peripheral surface of the cylindrical convex part is precisely matched with the inner peripheral surface of the circular concave part.

4. The tool for replacing an escalator drive shaft according to claim 1, wherein a first accommodating cavity is formed on one side of the first tool, and the original shaft adapter is adapted to be accommodated in the first accommodating cavity.

5. The tool for replacing an escalator drive shaft according to claim 1, wherein the first tool and the second tool have second positioning features which fit with each other, so that the central axis of the second tool assembled on the first tool coincides with the central axis of the original shaft adapter.

6. The tool for replacing an escalator drive shaft according to claim 5, wherein the second tool is circular and adapted to be sleeved on the first tool.

7. The tool for replacing an escalator drive shaft according to claim 6, wherein the second positioning features include an outer peripheral surface of the first tool and an inner peripheral surface of the second tool, and the outer peripheral surface of the first tool is precisely matched with the inner peripheral surface of the second tool.

8. The tool for replacing an escalator drive shaft according to claim 1, wherein:
   a connecting hole corresponding to a threaded hole in the original shaft adapter is formed in the first tool; and
   the first tool is adapted to be connected to the original shaft adapter by a first threaded fastener passing through the connecting hole.

9. The tool for replacing an escalator drive shaft according to claim 1, wherein a mounting slot is formed in the second tool, and the second tool is adapted to be connected to a truss of the escalator by a second threaded fastener passing through the mounting slot.

10. The tool for replacing an escalator drive shaft according to claim 1, wherein the first tool and the new shaft adapter have third positioning features which fit with each other, so that the central axis of the first tool assembled on the new shaft adapter coincides with the central axis of the new shaft adapter.

11. The tool for replacing an escalator drive shaft according to claim 10, wherein a second accommodating cavity is formed on the other side of the first tool, and the new shaft adapter is adapted to be accommodated in the second accommodating cavity of the first tool.

12. The tool for replacing an escalator drive shaft according to claim 11, wherein the third positioning features include an inner peripheral surface of the second accommodating cavity and an outer peripheral surface of the new shaft adapter, and the inner peripheral surface of the second accommodating cavity of the first tool is precisely matched with the outer peripheral surface of the new shaft adapter.

13. A method for replacing an escalator drive shaft, the method comprising:
   removing an original drive shaft and an original shaft collar from a truss of an escalator, and retaining an original shaft adapter matching with the original shaft collar on the truss;
   providing a first tool, and assembling a first side of the first tool on the original shaft adapter, wherein the first tool and the original shaft adapter have first positioning features which fit with each other, so that a central axis of the first tool assembled on the original shaft adapter coincides with a central axis of the original shaft adapter;
   providing a second tool, assembling the second tool on the first tool, wherein the first tool and the second tool have second positioning features which fit with each other, so that a central axis of the second tool assembled on the first tool coincides with the central axis of the first tool;
   fixing the second tool on the truss;
   removing the first tool and the original shaft adapter from the truss;
   assembling the other side of the first tool on a new shaft adapter, wherein the first tool and the new shaft adapter have third positioning features which fit with each other, so that the central axis of the first tool assembled on the new shaft adapter coincides with the central axis of the new shaft adapter;
   assembling the first tool and the new shaft adapter into the second tool, wherein the first tool and the second tool matching with each other by the second positioning features, so that the central axis of the new shaft adapter coincides with the central axis of the second tool;
fixing the new shaft adapter to the truss;
removing the first tool and the second tool from the truss; and
assembling a new drive shaft and a new shaft collar onto the new shaft adapter.

14. The method according to claim 13, wherein:
a circular concave part is formed on the original shaft adapter, and a cylindrical convex part which is matched with the circular concave part is formed on the first tool;
the first positioning features include an outer peripheral surface of the cylindrical convex part and an inner peripheral surface of the circular concave part, the outer peripheral surface of the cylindrical convex part is precisely matched with the inner peripheral surface of the circular concave part.

15. The method according to claim 13, wherein, after the first tool is assembled to the original shaft adapter, the first tool is fixed to the original shaft adapter by a first threaded fastener.

16. The method according to claim 15, wherein:
a connecting hole corresponding to a threaded hole in the original shaft adapter is formed in the first tool; and
the first threaded fastener passes through the connecting hole in the first tool and is screwed into the threaded hole in the original shaft adapter, so as to fix the first tool on the original shaft adapter.

17. The method according to claim 13, wherein a first accommodating cavity is formed on one side of the first tool, and the original shaft adapter is adapted to be accommodated in the first accommodating cavity.

18. The method according to claim 13, wherein the second tool is circular and adapted to be sleeved on the first tool.

19. The method according to claim 18, wherein the second positioning features include an outer peripheral surface of the first tool and an inner peripheral surface of the second tool, and the outer peripheral surface of the first tool is precisely matched with the inner peripheral surface of the second tool.

20. The method according to claim 13, wherein the second tool is fixed to the truss by a second threaded fastener.

21. The method according to claim 20, wherein a mounting slot is formed in the second tool, the second threaded fastener passes through the mounting slot and is threaded to the truss, so as to fix the second tool to the truss.

22. The method according to claim 13, wherein a second accommodating cavity is formed on the other side of the first tool, and the new shaft adapter is adapted to be accommodated in the second accommodating cavity of the first tool.

23. The method according to claim 22, wherein the third positioning features include an inner peripheral surface of the second accommodating cavity and an outer peripheral surface of the new shaft adapter, and the inner peripheral surface of the second accommodating cavity of the first tool is precisely matched with the outer peripheral surface of the new shaft adapter.

24. The method according to claim 13, wherein the new shaft adapter is fixed to the truss by a third threaded fastener.

25. The method according to claim 13, wherein:
a first pin hole is formed in the new shaft adapter, and a second pin hole corresponding to the first pin hole is formed in the truss; and
after the first tool and the second tool are removed from the truss, a pin is inserted into the first pin hole and the second pin hole to improve the connection strength between the new shaft adapter and the truss.

* * * * *